June 16, 1936.  E. FROHWERK  2,044,287

AUTOMATIC TIRE INFLATER

Filed April 8, 1935

INVENTOR:
Eduard Frohwerk,
BY
F. G. Fischer,
ATTORNEY.

Patented June 16, 1936

2,044,287

UNITED STATES PATENT OFFICE 2,044,287

AUTOMATIC TIRE INFLATER

Eduard Frohwerk, Kansas City, Kans.

Application April 8, 1935, Serial No. 15,281

4 Claims. (Cl. 152—11.5)

My invention pertains to means for automatically inflating pneumatic tires and it contemplates the provision of such a device whereby the tires will at all times be inflated with air to a uniform degree.

The invention further contemplates means whereby should the air escape from the tire due to a puncture or leak the tire will be prevented from becoming deflated and thus eliminate the necessity of an autoist having to run on a "flat" tire until such time as the tire or casing may be repaired.

The primary object of the invention is to provide a device supported by a pneumatic tired wheel which, when the wheel is in motion will supply air to the tire.

Another object of the invention is to provide a construction in which the air in the tire may be maintained at a predetermined pressure, that is, the constant supply of air may not rise above a certain pressure which would tend to burst the tube.

A further object is to provide a construction which may be supported on the brake drum of a wheel and which, while forming an effective air pump, will not interfere with the movement of the wheel, or itself be disarranged by said movement.

A further object is to provide a device in which the desired pressure may be regulated within the range of ordinary tire pressures.

A further object is to provide a device which may be disconnected from the tire when a change of tires is made, and without dismounting the device from the brake drum.

In order that the invention may be fully understood, reference will now be had to the accompanying drawing, in which.

Figure 1:
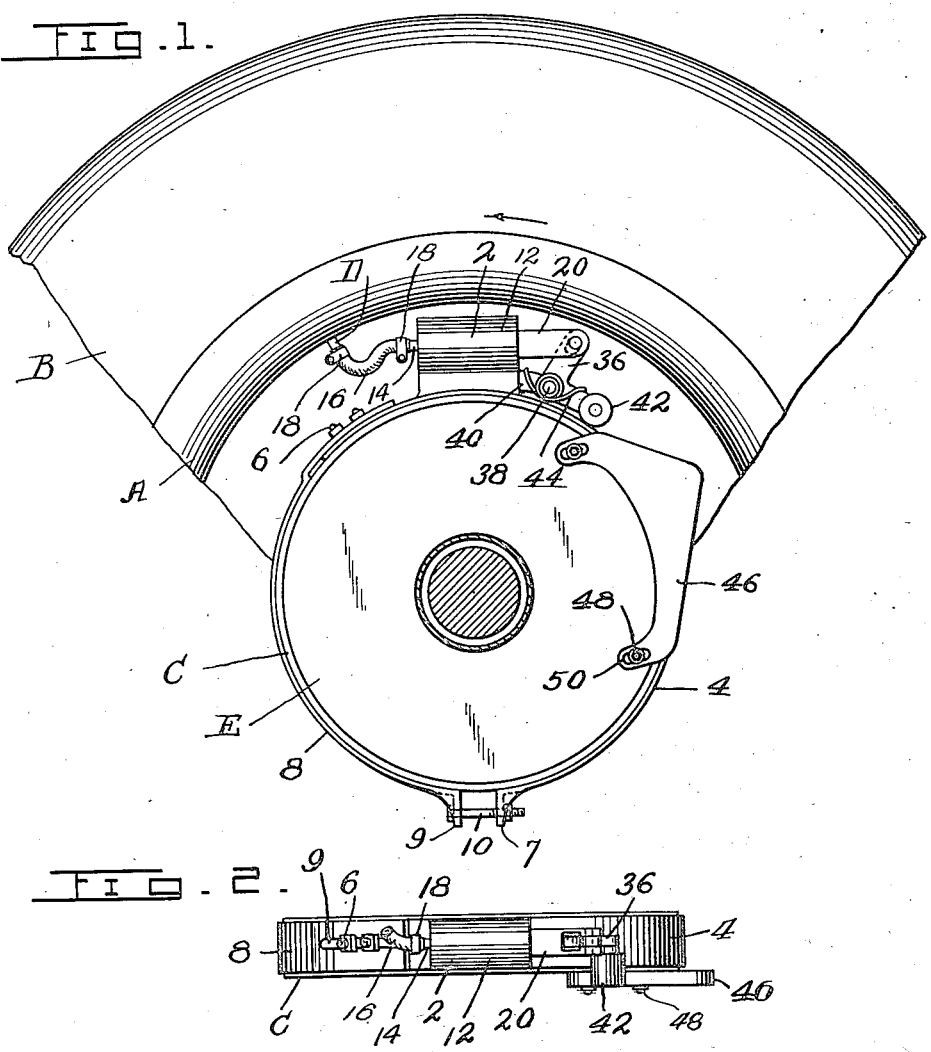
Fig. 1 is a broken side elevation of a wheel equipped with my device.
Figure 2:
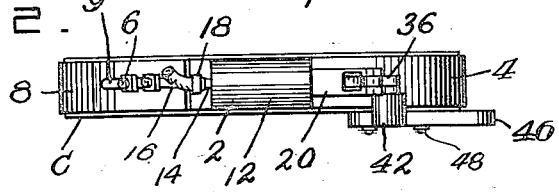
Fig. 2 is a plan view of the brake drum with my device mounted thereon and the wheel removed.

Referring in detail to the different parts, A designates the wheel which is equipped with a pneumatic tire B and a brake drum C. As practically all brakes of late model automotive vehicles are of the internal type in which the circumference of the brake drum C is free of external projections my device can be readily mounted upon said brake drum and thus eliminate the necessity of providing various fastening devices which would otherwise be required if the device were fastened to a disk wheel, or to the wooden or wire spokes with which a great many wheels are equipped.

Referring more particularly to the device constituting the present invention, 2 designates an air pump which is fixed upon a flexible strap 4 adjustably connected by stud bolts 6 to another strap 8 having a slot 9 through which the stud bolts 6 project. The straps 4 and 8 are adapted to be drawn taut around the circumference of the brake drum C by suitable means such as a bolt 10 extending through openings in the ends 7 and 9 of the straps 4 and 8, respectively. By connecting the straps 4 and 8 as stated they may be adjusted to fit brake drums of different diameters.

Figure 3:
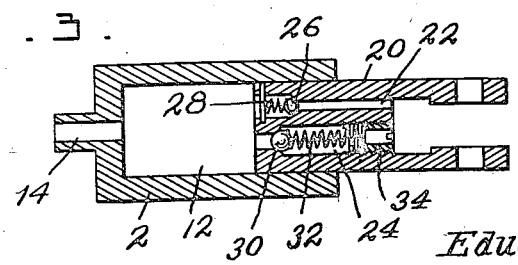
Fig. 3 is a longitudinal sectional view of the air pump forming an important feature of the invention.

The air pump 2 includes a cylinder 12, which, as shown by Fig. 3, is open at one end and closed at its opposite end, with the exception of an outlet 14 adapted to be connected to the customary valve stem D of the tire through the intermediary of a flexible tube 16 secured to the outlet 14 and the stem D by suitable means such as respective clamps 18.

20 designates a piston reciprocably mounted in and approximately the same length as the cylinder 12 provided with longitudinal air ducts 22 and 24 extending from end to end of the piston. The air duct 22 is equipped at its inner end with an inwardly opening check valve 26 normally held in seated position by means of a relatively weak spring 28 which allows said check valve 26 to open and admit air to the cylinder 12 at each outward stroke of the piston 20. The foregoing arrangement allows the cylinder 12 to fill with air which is forced into the tire on the forward stroke of the piston 20 and also prevents formation of a vacuum within the cylinder 12 which would prevent or retard the outward stroke of the piston. The duct 24 is provided at its inner end with an outwardly opening check valve 30 normally held to its seat by a coil spring 32 which is larger and much stiffer than the spring 28 to prevent the valve 30 from opening until a predetermined pressure is attained in the tire B.

Means for regulating the tension of the spring 32 is provided in the form of a tubular nut 34 threaded in the outer end of the air duct 24 and adapted to be adjusted inwardly or outwardly to regulate the tension of the spring 32 so that the check valve 30 may open under any predetermined pressure.

The piston 20 is actuated by means of a bellcrank 36 fulcrumed upon a pivot 38 carried by an arm 40 projecting rearwardly from the base of the cylinder 12. The rear end of the bell-crank 36 is equipped with an antifriction roller 42 which is yieldably held against the strap 4 by means of a spring 44.

46 designates a cam arranged in the path of the roller 42 and adjustably secured to the usual dust plate E of the brake mechanism by suitable means such as screws 48 extending through slots 50 in the cam and threaded into the dust plate E.

With the foregoing arrangement it is apparent that on each revolution of the wheel A the roller 42 will run over the cam 46 and effect the inward stroke of the piston 20 through the intermediary of the bell-crank 36. After the roller 42 has traveled over the cam 46 it is forced inwardly against the strap 4 by means of the spring 44 and moves the piston on its outward stroke through the intermediary of the bell-crank 36. As the piston 20 is forced inwardly on each revolution of the wheel A it forces air into the tire B through the outlet 14, the tube 16 and the valve stem D, which latter is preferably equipped with the usual Schrader or equivalent type of check valve for preventing backward flow of the air from the tire through said valve stem D.

Should the air in the tire B exceed the pressure at which the spring 32 has been adjusted to allow the valve 30 to open, the air compressed in the cylinder 12 at each inward stroke of the piston 20 will open said valve 30 and escape to atmosphere through the duct 24. Thus all danger of bursting the tire from excess air pressure is eliminated. Excessive operation of the valve 30 may be avoided by regulating the volume of air compressed by the pump. This regulation may be accomplished by moving the cam 46 inwardly to impart a shorter stroke to the piston 20.

From the foregoing description it is apparent that I have provided a device embodying the features above pointed out, and while I have shown one form of the invention I reserve all rights to such other forms and modifications thereof as properly fall within the spirit and scope of the invention as claimed.

Having thus described my invention, what I claim and desire to secure by Letters Patent, is:

1. In combination with a wheel having a pneumatic tire and a brake drum, an air pump connected to said tire to supply the latter with air under pressure, strap means carrying said air pump and adapted to embrace the circumference of the brake drum, a bell-crank mounted upon and adapted to operate the air pump, and means for operating said bell-crank.

2. In combination, a wheel having a penumatic tire and a brake drum, an air pump connected to said tire to supply the latter with air under pressure, a strap fixed to the air pump, another strap having one end adapted to overlap and adjustably engage the first strap and cooperate therewith in firmly embracing the circumference of the brake drum, means for securing the second strap at any point of its adjustment on the first strap, a bell-crank mounted upon one of said straps and adapted to operate the air pump and means for operating the said bell-crank.

3. In combination, a wheel having a penumatic tire and a brake drum, a stationary dust-plate adjacent to said brake drum, a strap firmly embracing said brake drum, an air pump mounted upon said strap and provided with a reciprocatory piston, means establishing communication between the tire and said air-pump, a bell-crank for operating said piston, spring means for moving said bell-crank in one direction, a cam for moving said bell-crank in the reverse direction, and means whereby said cam is adjustably secured to the dust-plate to vary the length of the movement of the bell-crank.

4. In combination, a wheel having a pneumatic tire and a brake drum, a stationary dust-plate adjacent to said brake drum, a strap firmly embracing said brake drum, an air pump mounted upon said strap and provided with a reciprocatory piston, means establishing communication between the tire and said air pump, a bell-crank for operating said piston, spring means for moving said bell-crank in one direction, a cam for moving said bell-crank in the reverse direction provided with slots so that it may be adjusted inwardly or outwardly upon the dust-plate to vary the length of the movement of the bell-crank, and means for securing said cam at any point of its adjustment upon the dust-plate.

EDUARD FROHWERK.